W. H. BOWMAN.
Nut-Locks.

No. 144,886. Patented Nov. 25, 1873.

Witnesses.

Inventor.
W. H. Bowman
Per
Attorneys.

UNITED STATES PATENT OFFICE.

WILLIAM H. BOWMAN, OF LONDON, OHIO.

IMPROVEMENT IN NUT-LOCKS.

Specification forming part of Letters Patent No. 144,886, dated November 25, 1873; application filed July 26, 1873.

*To all whom it may concern:*

Be it known that I, WM. H. BOWMAN, of London, Madison county and State of Ohio, have invented a new and Improved Nut-Lock, of which the following is a specification:

The invention will first be fully described, and then pointed out in the claim.

Figure 1:
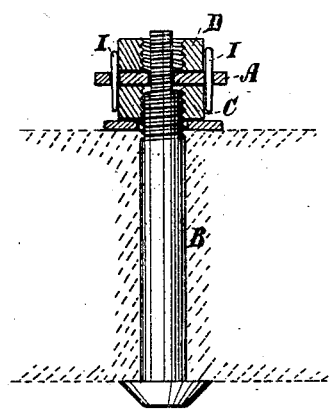
Figure 3:
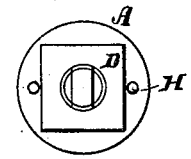
Figure 4:
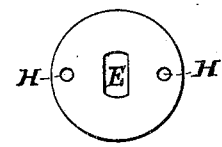
Figure 2:
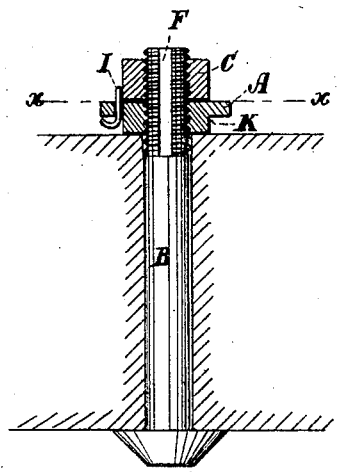

Figure 1 is a sectional view, showing the arrangement when two nuts are used. Fig. 2 is a section, showing the arrangement when one nut is used. Fig. 3 is a front elevation of Fig. 1. Fig. 4 is a front elevation of the washer used in Fig. 1, and Fig. 5 is a section of Fig. 2 on the line $x$ $x$.

Figure 5:
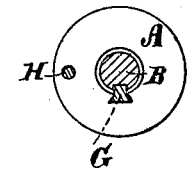

A represents the washer, which is fitted on the bolt B, either inside the nut C or between nuts C D, in any approved way, so that it cannot turn on the bolt—say, by a hole with one or two sides flattened, as shown at E, the bolt being flattened correspondingly, or by a tongue on the washer fitting in the groove F on the bolt, or a key fitting in the groove, and in a notch in the washer, as shown at G, Fig. 5. The washer is made larger in diameter than the nuts, so as to project beyond the sides, and has one or more holes, H, in which a key or keys or pins I are fitted to prevent the nuts from turning. The keys or pins are bent so as to prevent them from working loose. When only one washer is used, as in Fig. 2, it has an annular recess, K, on the side next the plate, so that the fastening-pin I can be clinched by driving it against the iron; or two washers, one of which is larger than the other, may be used.

Having thus described my invention, I claim as new and desire to secure by Letters Patent—

The edge-perforated washer A, connected and turning only with the bolt, and projecting laterally beyond the nut or nuts, combined with pins I to lock the nut or nuts, in the manner described.

WILLIAM H. BOWMAN.

Witnesses:
A. S. MESSMORE,
LEONARD EASTMAN.